(12) United States Patent
Rummel et al.

(10) Patent No.: US 9,500,251 B2
(45) Date of Patent: Nov. 22, 2016

(54) SHOCK ABSORBER HAVING ORIFICE CHECK DISC

(71) Applicant: Tenneco Automotive Operating Company Inc., Lake Forest, IL (US)

(72) Inventors: Chad Rummel, Oxford, MI (US); Garl Gordon, Fenton, MI (US); Daniel Keil, Temperence, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 22 days.

(21) Appl. No.: 14/553,118

(22) Filed: Nov. 25, 2014

(65) Prior Publication Data
US 2016/0146286 A1     May 26, 2016

(51) Int. Cl.
*F16F 9/34*     (2006.01)
*F16F 9/348*     (2006.01)
*F16F 9/18*     (2006.01)

(52) U.S. Cl.
CPC ............... *F16F 9/3484* (2013.01); *F16F 9/18* (2013.01)

(58) Field of Classification Search
CPC ........ F16K 15/148; F16K 9/34; F16K 9/348; F16K 9/3214; F16K 9/3481; F16K 9/3485; B60G 13/08
USPC ............................... 188/282.1–282.6, 322.15
See application file for complete search history.

(56) References Cited

U.S. PATENT DOCUMENTS

| | | | |
|---|---|---|---|
| 3,837,445 A | 9/1974 | Pierle | |
| 3,927,871 A | 12/1975 | de Baan | |
| 4,183,509 A | 1/1980 | Nishikawa et al. | |
| 4,512,447 A * | 4/1985 | Miura | F16K 15/148 188/282.6 |
| 4,724,937 A | 2/1988 | Fannin et al. | |
| 4,830,152 A | 5/1989 | Rauert et al. | |
| 4,964,493 A | 10/1990 | Yamaura et al. | |
| 5,148,897 A | 9/1992 | Vanroye | |
| 5,261,448 A | 11/1993 | Furuya et al. | |
| 5,409,087 A | 4/1995 | Angermann et al. | |

(Continued)

FOREIGN PATENT DOCUMENTS

| | | |
|---|---|---|
| JP | 2013-204664 A | 10/2013 |
| KR | 10-0443884 B1 | 8/2004 |
| WO | WO-2013110728 A1 | 8/2013 |

OTHER PUBLICATIONS

International Search Report and Written Opinion dated Jan. 28, 2016 in the corresponding PCT Application No. PCT/US2015/062170 (15 pages).

*Primary Examiner* — Christopher Schwartz
(74) *Attorney, Agent, or Firm* — Harness, Dickey & Pierce, P.L.C.

(57) ABSTRACT

A shock absorber for a vehicle includes a pressure tube that defines a fluid chamber and a piston disposed within the fluid chamber. The piston divides the fluid chamber into an upper working chamber and a lower working chamber, and defines a compression passage and a rebound passage. A valve disc assembly of the shock absorber engages the piston and controls the flow of fluid between the upper and lower working chambers. The valve disc assembly includes an orifice check disc and an orifice disc. The orifice disc defines a bleed passage between the upper and lower working chambers. The orifice check disc is disposed between the piston and the orifice disc. The orifice check disc closes the bleed passage as the fluid flows in a first direction and opens the bleed passage as the fluid flows in a second direction opposite of the first direction.

19 Claims, 7 Drawing Sheets

(56) References Cited

U.S. PATENT DOCUMENTS

| | | |
|---|---|---|
| 5,810,127 A | 9/1998 | Schmidt |
| 5,937,976 A * | 8/1999 | Grundei .............. F16F 9/3481 188/282.6 |
| 6,089,142 A | 7/2000 | Adrian et al. |
| 6,230,858 B1 | 5/2001 | Moradmand et al. |
| 6,382,372 B1 | 5/2002 | Keil et al. |
| 6,533,085 B2 | 3/2003 | Moradmand et al. |
| 6,561,326 B2 | 5/2003 | Gotz |
| 6,581,734 B2 * | 6/2003 | Heyn .................. F16F 9/3485 188/282.6 |
| 6,634,379 B2 * | 10/2003 | Asadi .................. F16F 9/3214 137/512.1 |
| 6,655,512 B2 | 12/2003 | Moradmand et al. |
| 6,672,436 B1 | 1/2004 | Keil et al. |
| 6,899,207 B2 | 5/2005 | Deferme et al. |
| 6,981,578 B2 | 1/2006 | Leiphart et al. |
| 7,040,468 B2 * | 5/2006 | Shinata .............. F16F 9/348 188/282.6 |
| 7,070,029 B2 | 7/2006 | Deferme |
| 7,407,044 B2 | 8/2008 | Jee |
| 7,703,586 B2 | 4/2010 | Deferme |
| 7,766,137 B2 | 8/2010 | De Kock |
| 7,980,368 B2 * | 7/2011 | Park .................. F16F 9/3484 188/282.5 |
| 8,794,407 B2 | 8/2014 | Vanbrabant et al. |
| 2002/0063023 A1 | 5/2002 | Moradmand et al. |
| 2008/0000739 A1 * | 1/2008 | Behmenburg ......... B60G 17/08 188/322.15 |
| 2008/0236968 A1 | 10/2008 | Watanabe |
| 2009/0000891 A1 | 1/2009 | Kouyama et al. |
| 2009/0260938 A1 | 10/2009 | Hikosaka |
| 2013/0161138 A1 * | 6/2013 | Barefoot .............. F16F 9/34 188/282.1 |
| 2014/0262655 A1 * | 9/2014 | Tuts .................... B60G 13/08 188/322.15 |
| 2014/0332332 A1 | 11/2014 | Lawler et al. |

\* cited by examiner

SHOCK ABSORBER HAVING ORIFICE CHECK DISC

FIELD

The present disclosure relates to shock absorbers. More particularly, the present disclosure relates to a valve disc assembly for controlling damping characteristics of a shock absorber during low hydraulic fluid flow.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to the unsprung portion of tile vehicle. The piston is connected to the sprung portion of the automobile through a piston rod which extends through the pressure tube.

The piston divides the pressure tube into an upper working chamber and a lower working chamber both of which are filled with hydraulic fluid. Because the piston is able through valving, to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle of the vehicle. In a dual tube shock absorber, a fluid reservoir or reserve chamber is defined between the pressure tube and a reserve tube. A base valve is located between the lower working chamber and the reserve chamber to control the flow of fluid between the lower working chamber and the reserve chamber.

For a full displacement valving system, all rebound damping forces produced by the shock absorber are the result of piston valving while compression forces are a combination of piston and cylinder end valving. The greater the degree to which the flow of fluid within the shock absorber is restricted by the piston and/or cylinder end, the greater the damping forces which are generated by the shock absorber. Thus, a highly restricted flow of fluid would produce a firm ride while a less restricted flow of fluid would produce a soft ride.

Shock absorbers have been developed to provide different damping characteristics depending on the speed or acceleration of the piston within the pressure tube. Because of the exponential relation between pressure drop and flow rate, it is a difficult task to obtain a damping force at relatively low piston velocities (i.e., low hydraulic fluid speed), particularly at velocities near zero. Low speed damping force is important to vehicle handling since most vehicle handling events are controlled by low speed vehicle body velocities.

Various systems for tuning shock absorbers during low speed movement of the piston include a fixed low speed orifice or orifices which provide a defined leak path which is always open across the piston for both compression and rebound. While a soft ride is generally preferred during compression, a firm ride is generally preferred during rebound.

SUMMARY

This section provides a general summary of the disclosure, and is not a comprehensive disclosure of its full scope or all of its features. The present disclosure relates to a shock absorber for a vehicle, and more particularly, to a valve disc assembly that controls the flow of fluid between an upper working chamber and a lower working chamber during low fluid flow. The shock absorber includes a pressure tube that defines a fluid chamber, a piston that is disposed within the fluid chamber, and a valve disc assembly that engages with the piston.

The piston divides the fluid chamber into an upper working chamber and a lower working chamber, and defines a compression passage and a rebound passage. The compression passage and the rebound passage extend through the piston between the upper working chamber and the lower working chamber.

The valve disc assembly controls the flow of fluid between the upper working chamber and the lower working chamber. The valve disc assembly includes an orifice check disc and an orifice disc. The orifice disc defines a bleed passage. The orifice check disc is flexible and is disposed between the piston and the orifice disc. The orifice check disc controls the flow of fluid through the orifice disc or, in other words, the bleed passage.

The orifice check disc closes the bleed passage as the fluid flows from the upper working chamber toward the lower working chamber (i.e., a rebound stroke or first direction of fluid flow) and opens the bleed passage when fluid flows from the lower working chamber toward the upper working chamber (i.e., a compression stroke or second direction of fluid flow). For instance, when the fluid flows in the first direction at low fluid speed, the orifice check disc flexes towards the orifice disc and closes the bleed passage to prevent fluid from flowing through. On the other hand, when the fluid flows in the second direction at low fluid speed, the orifice check disc flexes away from the orifice disc toward the piston and opens the bleed passage to allow fluid to flow through. Thus, the orifice check disc controls the flow of fluid through the bleed passage which controls the damping characteristics of the shock absorbers during low fluid speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
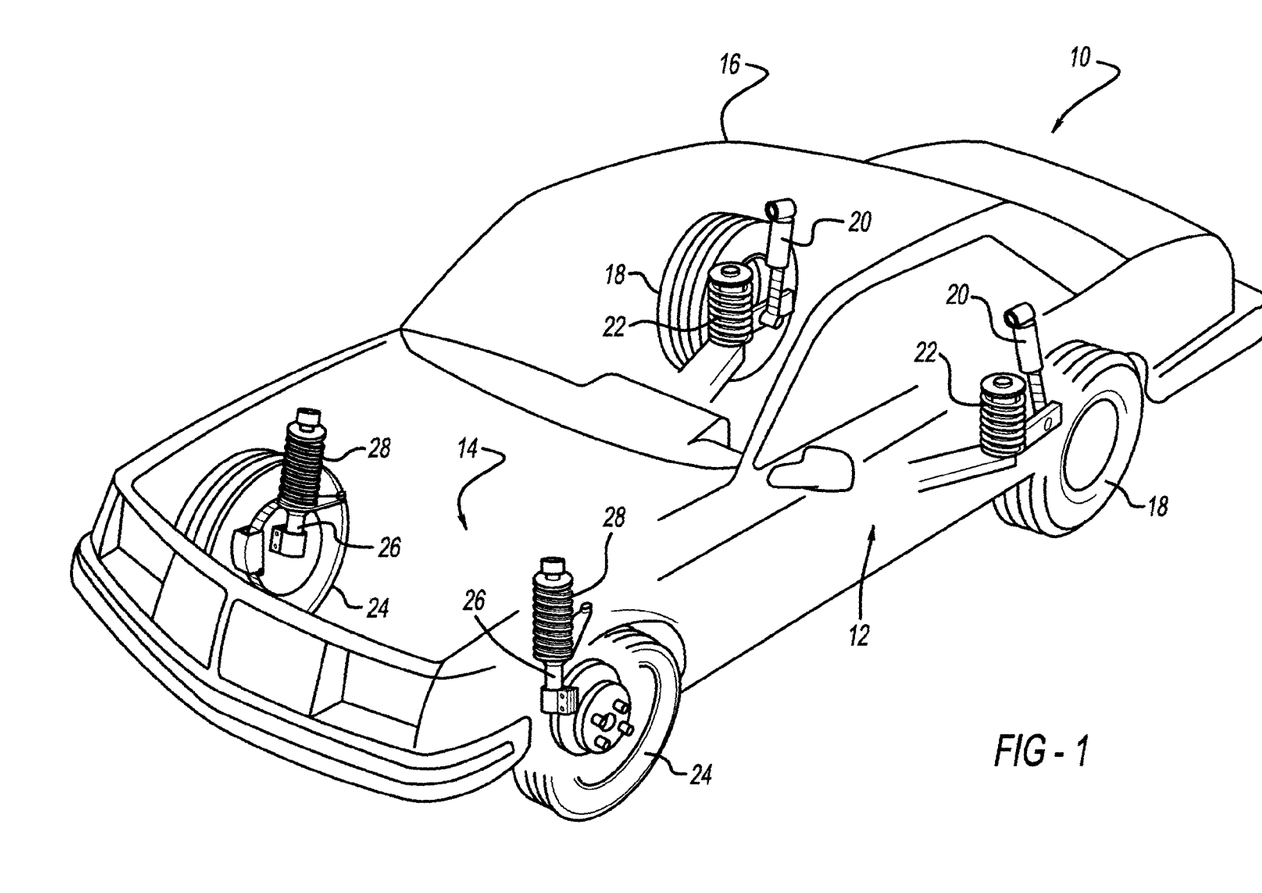
FIG. 1 is a schematic representation of a typical automobile which incorporates at least one shock absorber.

Example embodiments will now be described more fully with reference to the accompanying drawings. Referring now to the drawings in which like reference numerals designate like or corresponding parts throughout the several views, FIG. 1 illustrates a vehicle 10 incorporating a suspension system with shock absorbers having an orifice check disc in accordance with the present disclosure. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28.

Shock absorbers 20 and 26 serve to dampen the relative motion of the unsprung portion (i.e., front and rear suspensions 12 and 14, respectively) and the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent front and/or independent rear suspension systems.

Figure 2:
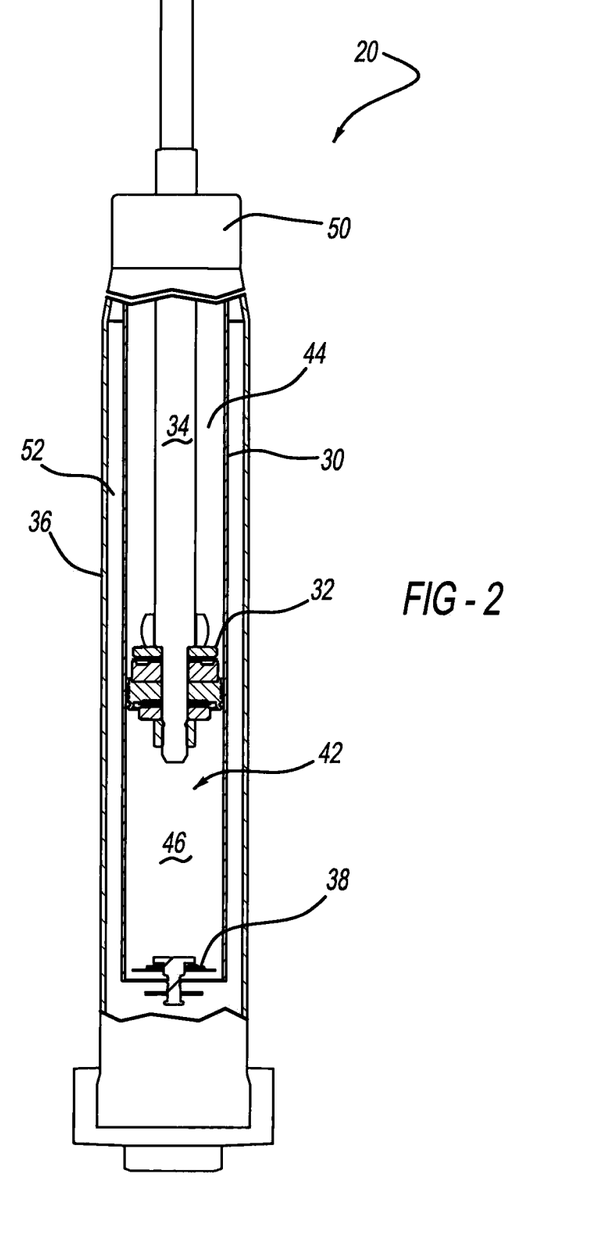
FIG. 2 is a side partial cross-sectional view of a shock absorber.

Referring now to FIG. 2, shock absorber 20 is shown in greater detail. While FIG. 2 illustrates only shock absorber 20, it is to be understood that shock absorber 26 includes the same components as shock absorber 20. Shock absorber 26 only differs from shock absorber 20 in the manner in which it is adapted to be connected to the sprung and unsprung masses of vehicle 10. Furthermore, while the shock absorber 20 is depicted as a dual-tube shock absorber, shock absorber 20 may also be a mono-tube shock absorber.

Figure 3:
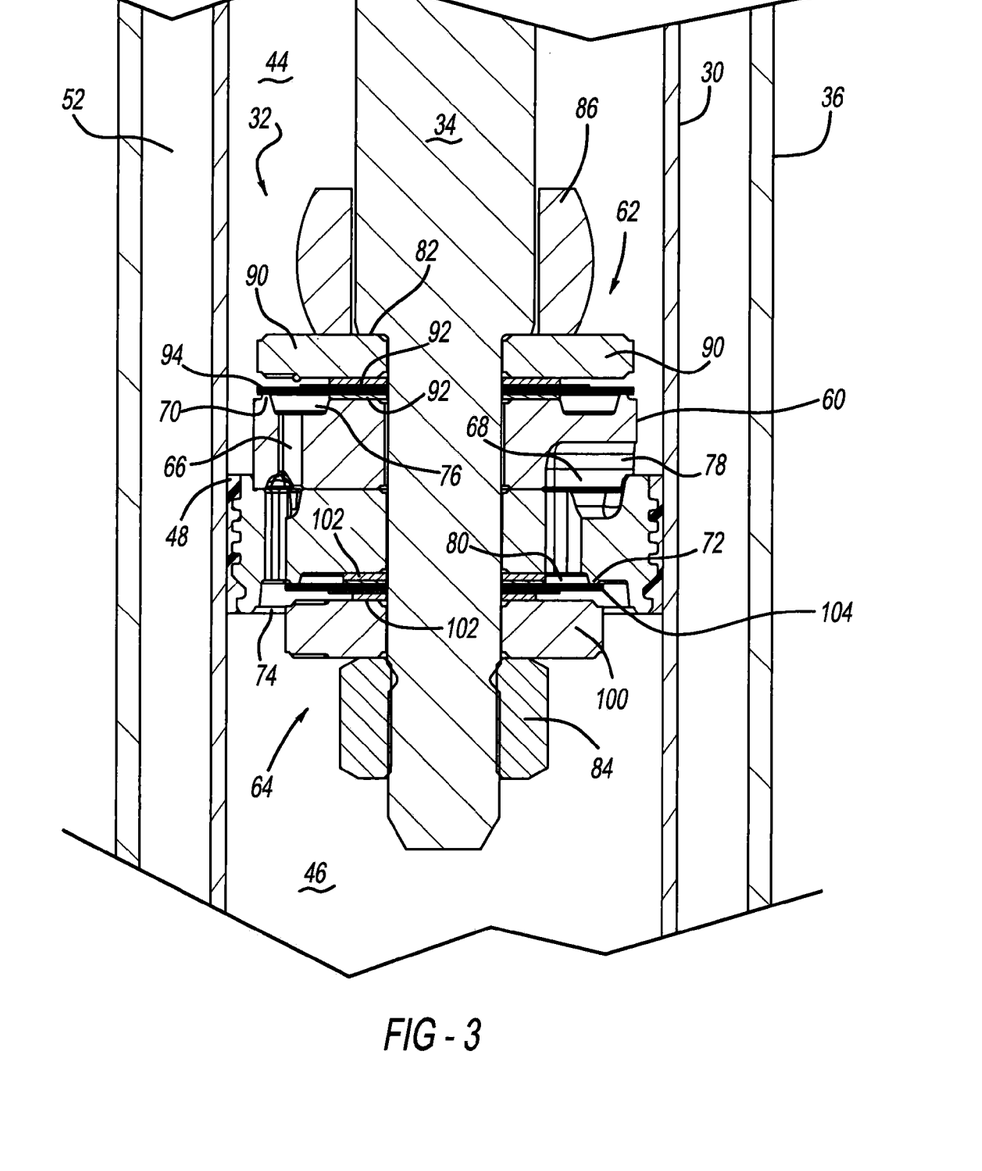
FIG. 3 is an enlarged cross-sectional view of a piston assembly of the shock absorber.

Shock absorber 20 comprises a pressure tube 30, a piston assembly 32, a piston rod 34, a reservoir tube 36, and a base valve assembly 38. Pressure tube 30 defines a working chamber 42. Piston assembly 32 is slidably disposed within pressure tube 30 and divides working chamber 42 into an upper working chamber 44 and a lower working chamber 46. A seal 48, which is shown in FIG. 3, is disposed between piston assembly 32 and pressure tube 30 to permit sliding movement of piston assembly 32 with respect to pressure tube 30 without generating undue frictional forces as well as sealing upper working chamber 44 from lower working chamber 46.

Piston rod 34 is attached to piston assembly 32 and extends through upper working chamber 44 and through an upper end cap 50 which closes the upper end of pressure tube 30. The end of piston rod 34 opposite to piston assembly 32 is adapted to be secured to the sprung portion of vehicle 10.

Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced flows through the base valve assembly 38, the piston assembly 32, or a combination thereof.

Reservoir tube 36 surrounds pressure tube 30 to define a fluid reservoir chamber 52 located between tubes 30 and 36. Base valve assembly 38 is disposed between lower working chamber 46 and reservoir chamber 52 to control the flow of fluid between chambers 46 and 52. When shock absorber 20 extends in length, fluid will flow from reservoir chamber 52 to lower working chamber 46 through base valve assembly 38. Fluid may also flow from upper working chamber 44 to lower working chamber 46 through piston assembly 98. When shock absorber 20 compresses in length, an excess of fluid must be removed from lower working chamber 46. Thus, fluid will flow from lower working chamber 46 to reservoir chamber 52 through base valve assembly 38.

Referring now to FIG. 3, piston assembly 32 comprises a piston body 60, a compression valve assembly 62, and a rebound valve assembly 64. Piston body 60 defines a plurality of compression fluid passages 66 and a plurality of rebound fluid passages 68, and includes a compression valve land 70 and a rebound valve land 72. Compression fluid passages 66 include an inlet 74 and an outlet 76. Rebound fluid passages 68 include an inlet 78 and an outlet 80. Compression fluid passages 66 and rebound fluid passages 68 fluidly couple upper working chamber 44 and lower working chamber 46.

Piston body 60 abuts with compression valve assembly 62 which abuts with a shoulder 82 formed on piston rod 34. Piston body 60 also abuts with rebound valve assembly 64 which is retained by a retaining nut 84. Retaining nut 84 and a retaining nut 86 secure piston body 60 and valve assemblies 62 and 64 to piston rod 34.

Compression valve assembly 62 includes a retainer 90, one or more spacers 92, and a valve disc assembly 94. Retainer 90 is disposed above piston body 60 and abuts with shoulder 82. Spacers 92 are disposed between valve disc assembly 94 and retainer 90 and between valve disc assembly 94 and piston body 60. Valve disc assembly 94 abuts with compression valve land 70 and closes outlet 76 of compression fluid passages 66.

Rebound valve assembly 64 also includes a retainer 100, one or more spacers 102, and a valve disc assembly 104. Retainer 100 is disposed below piston body 60 and abuts with retaining nut 84. Spacers 102 are disposed between valve disc assembly 104 and retaining nut 84 and between valve disc assembly 104 and piston body 60. Valve disc assembly 104 abuts with rebound valve land 72 and closes outlet 80 of rebound fluid passages 68.

The damping characteristics for both rebound (extension) and compression for shock absorber 20 are determined by the piston assembly 32. More particularly, piston assembly 32 is provided as a full flow piston assembly which includes valving for mid/high fluid speeds and an independent valving for low piston speeds (i.e., low hydraulic fluid flow or low fluid speed). During mid/high level speed, damping is controlled by the deflection of valve disc assembly 94 of compression valve assembly 62 and valve disc assembly 104 of rebound valve assembly 64. During low level speeds, damping is controlled by bleed passages. In the following, valve disc assembly 94 for compression valve assembly 62 is referred to as compression valve disc assembly 94 and valve disc assembly 104 for rebound valve assembly 64 is referred to as rebound valve disc assembly 104.

Fluid flowing through compression fluid passages 66 is controlled by compression valve assembly 62. During a compression stroke, fluid in lower working chamber 46 is pressurized and flows from lower working chamber 46 to compression fluid passages 66. The fluid pressure within compression fluid passage 66 eventually opens compression valve assembly 62 by deflecting compression valve disc assembly 94. Thus, fluid flows through compression fluid passages 66 into upper working chamber 44. Prior to the deflection of compression valve disc assembly 94, a controlled amount of fluid flows between upper working chamber 44 and lower working chamber 46 through a bleed passage which provides damping at low fluid speeds, as described herein.

Fluid flowing through rebound fluid passages 68 is controlled by rebound valve assembly 64. During the compression stroke, rebound valve assembly 64 restricts the flow of fluid through rebound fluid passages 68. Fluid in lower working chamber 46 exerts a force onto the rebound valve assembly 64. Rebound valve assembly 64 seals against land 72 of piston body 60, thereby preventing fluid from entering rebound fluid passages 68 from lower working chamber 46 at mid/high fluid speed.

During a rebound stroke, fluid in upper working chamber 44 is pressurized, and fluid flows from upper working chamber 44 to rebound fluid passages 68. The fluid pressure within rebound fluid passages 68 eventually opens rebound valve assembly 64 by deflecting rebound valve disc assembly 104. Thus, fluid flows through rebound fluid passages 68 into lower working chamber 46. Compression valve assembly 62 restricts the flow of fluid through compression fluid passages 66 during the rebound stroke. Fluid in upper working chamber 44 exerts a force onto compression valve assembly 62. Compression valve assembly 62 seals against land 70 of piston body 60, thereby preventing fluid from flowing through compression fluid passages 66. Prior to the deflection of rebound valve disc assembly 104, a controlled amount of fluid flows from lower working chamber 46 to upper working chamber 44 through a bleed passage which provides damping at low fluid speeds, as described herein.

Figure 4A:
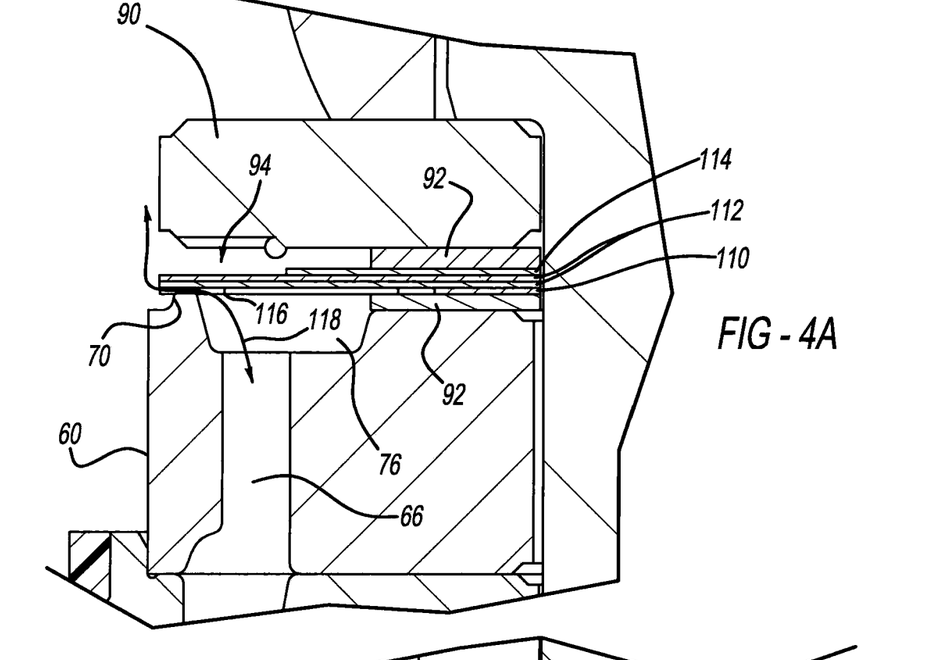
FIG. 4A is an enlarged cross-sectional view of a compression valve disc assembly of the piston assembly for controlling fluid through compression passages.
Figure 4B:
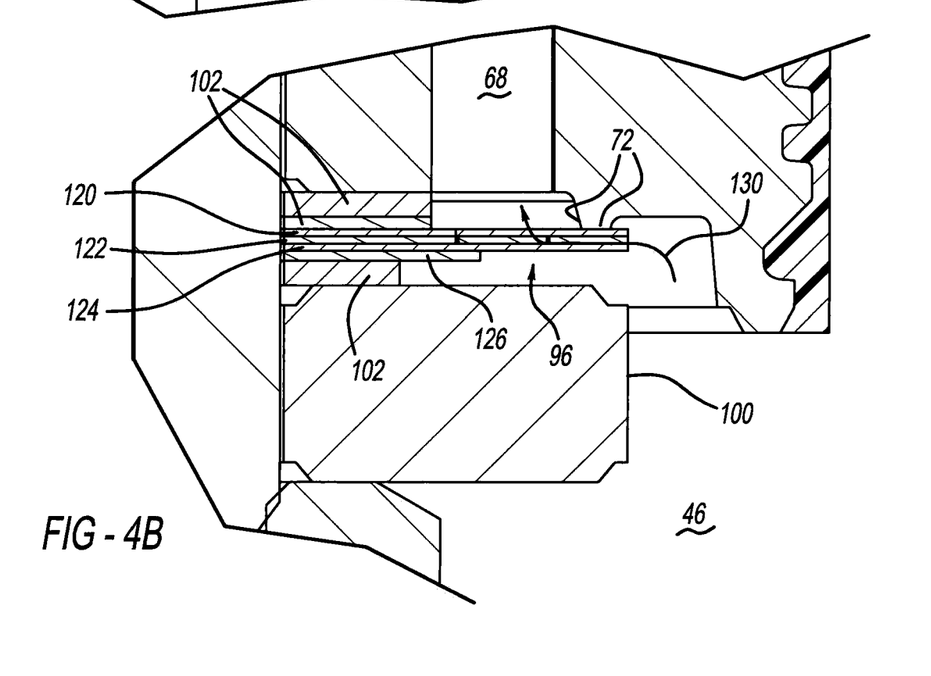
FIG. 4B is an enlarged cross-sectional view of a rebound valve disc assembly of the piston assembly for controlling fluid through rebound passages.

Referring now to FIGS. 4A and 4B, valve disc assembly 94 and valve disc assembly 104 include a plurality of discs which control flow of fluid through piston body 60. Compression valve disc assembly 94 includes an orifice disc 110, one or more solid discs 112, and a spring disc 114. Orifice disc 110 defines one or more orifices 116, and may also be referred to as a bleed disc. Solid discs 112 are disposed over orifice disc 110 to cover orifices 116 of orifice disc 110. Spring disc 114 is disposed over solid discs 112.

Orifice disc 110, solid discs 112, and spring disc 114 are positioned at land 70 of piston body 60. Orifice disc 110 abuts with land 70 of piston body 60. Orifice 116 forms a bleed passage referenced by arrow 118 for allowing fluid to flow between upper working chamber 44 and lower working chamber 46, at low piston speeds. Bleed passage 118 is open during compression and rebound, thereby allowing fluid to flow from lower working chamber 46 to upper working chamber 44 and vice versa.

Figure 5:
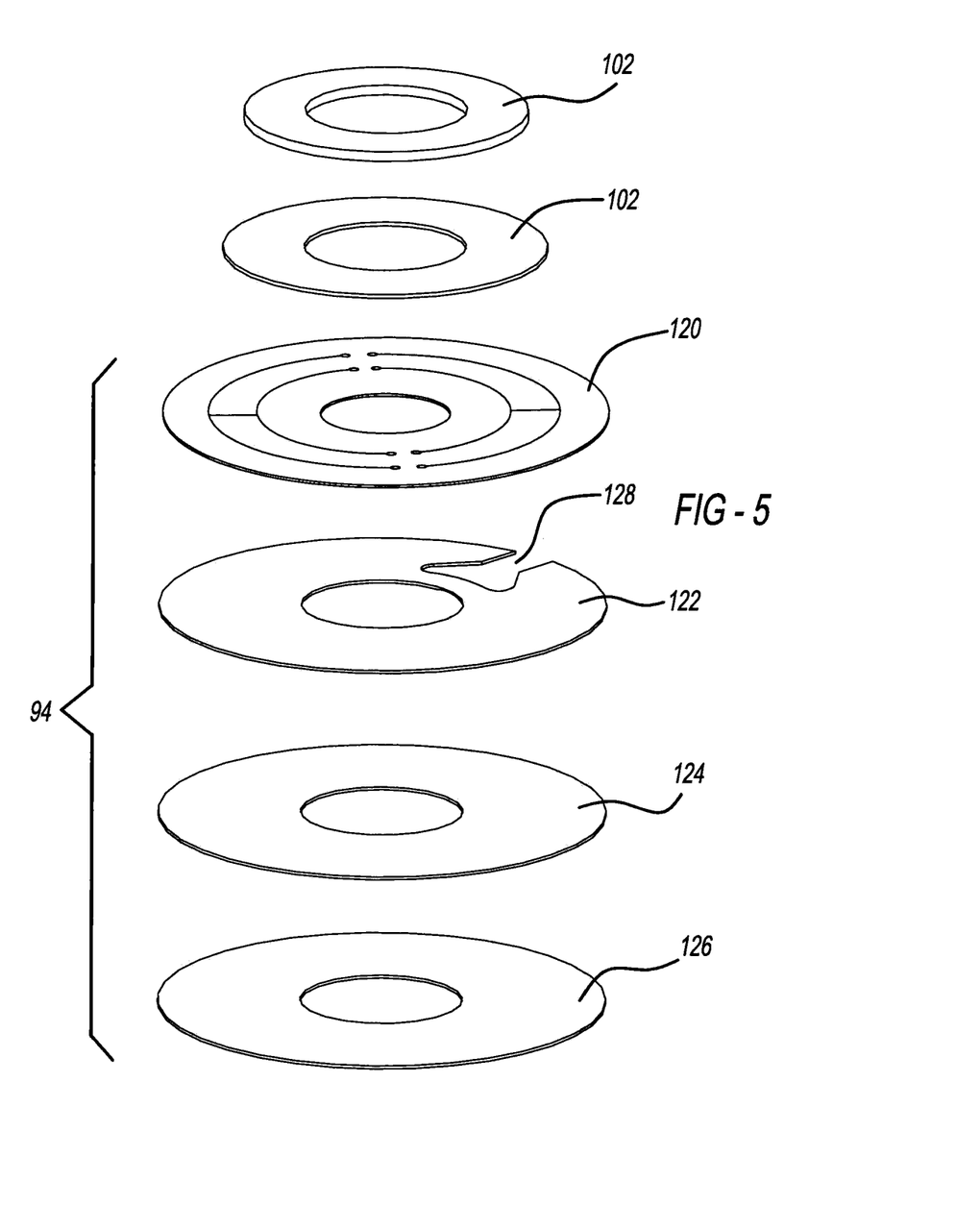
FIG. 5 is an exploded view of the rebound valve disc assembly for the rebound passages.

With additional reference to FIG. 5, rebound valve disc assembly 96 includes an orifice check disc 120, an orifice disc 122, a solid disc 124, and a spring disc 126. Orifice check disc 120 abuts with land 72 (FIG. 4B). Orifice disc 122 is disposed between orifice check disc 120 and solid disc 124. Solid disc 124 is disposed under orifice disc 122, and spring disc 126 is disposed under solid disc 126.

Orifice disc 122 defines an orifice 128 which forms a bleed passage referenced by arrow 130 in FIG. 4B. Bleed passage 130 and bleed passage 118 control damping characteristics of shock absorber 20 during low fluid speeds by permitting a limited amount of fluid to flow between upper working chamber 44 and lower working chamber 46. Unlike bleed passage 118 which is open during compression and rebound, bleed passage 130 is open during compression but is closed during rebound. That is, orifice check disc 120 controls the flow of fluid between upper working chamber 44 and lower working chamber by permitting fluid to flow from lower working chamber 46 to upper working chamber 44 and prohibiting fluid to flow from upper working chamber 44 to lower working chamber 46.

Figure 6:
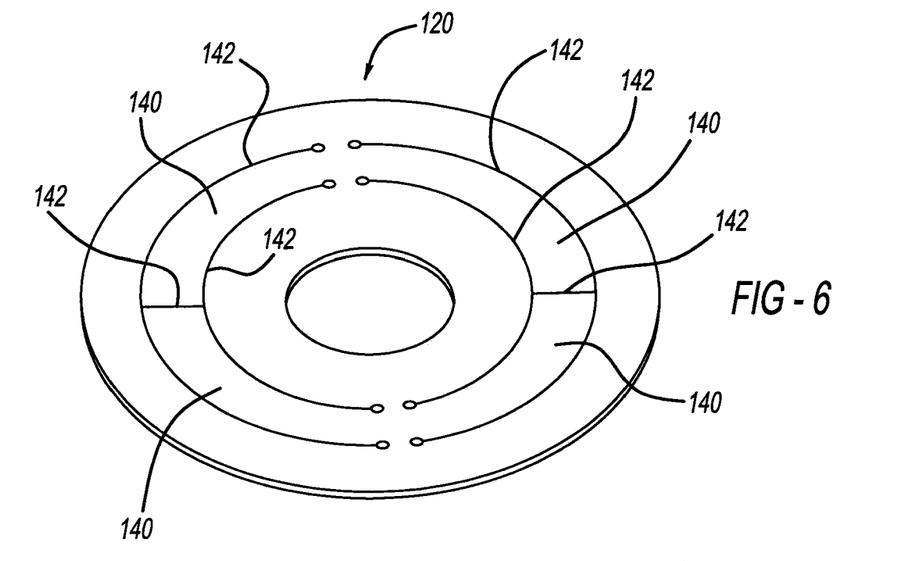
FIG. 6 is a perspective view of an orifice check disc of the rebound valve disc assembly.

With additional reference to FIG. 6, orifice check disc 120 includes a portion that is flexible or moveable to block fluid flow in one direction and allow fluid flow in the other direction. In the example embodiment, one or more cuts 142 form four arc-shaped tabs 140. Tabs 140 are moveable and form the flexible portion of orifice check disc 120. That is, tabs 140 flex toward piston body 60 or toward orifice disc 122 based on the direction of the fluid.

Figure 7A:
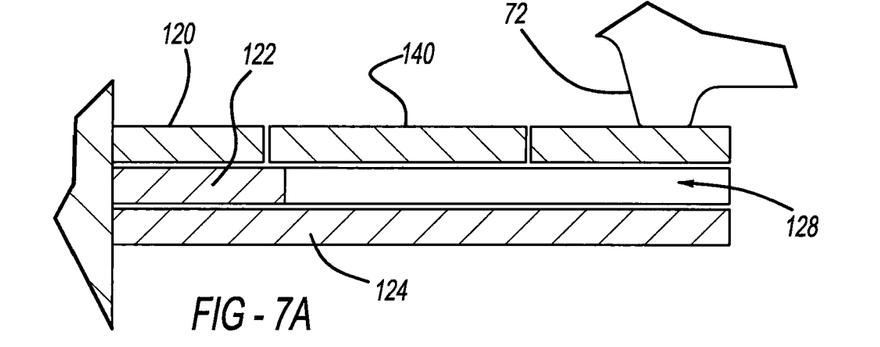
FIGS. 7A, 7B, and 7C illustrate operation of the orifice check disc of the rebound valve disc assembly.
Figure 7B:
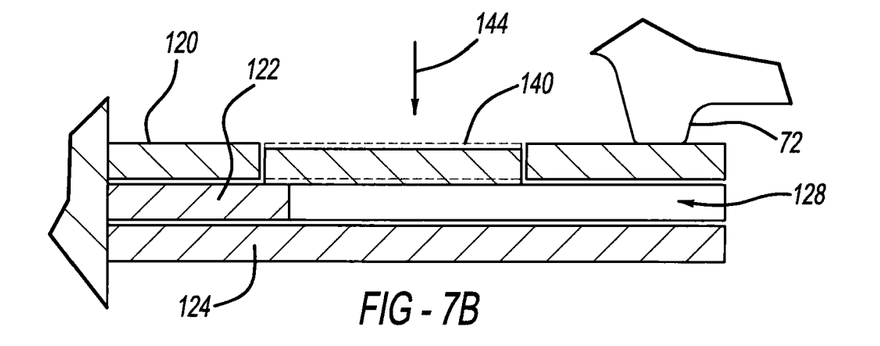

In FIG. 7A, orifice disc 120 is in a normal state in which fluid is not exerting a pressure on the rebound valve assembly 64 and tabs 140 are not flexing. FIG. 7B illustrates a rebound condition in which fluid from upper working chamber 44 flows through piston 60 via rebound fluid passages 68 and exerts a force onto rebound disc valve assembly 94, as indicated by arrow 144. Tabs 140 of orifice check disc 120 flex towards orifice disc 122 and exert a force onto orifice disc 122. Dotted line in FIG. 7B represents position of tabs 140 in the normal state of orifice check disc 120.

In a normal state, orifice check disc 120 may abut with orifice disc 122. In the rebound condition, tabs 140 exert a force onto orifice disc 122 which causes orifice disc 122 to press against solid disc 124. Tabs 140 of orifice check disc 120 seal orifice disc 122 to close bleed passage 130 formed by orifice 128. Accordingly, orifice check disc 120 and orifice disc 122 function as a solid disc, and fluid does not flow from rebound fluid passages 68 through orifice 128 into lower working chamber 46 during low fluid speeds.

Figure 7C:
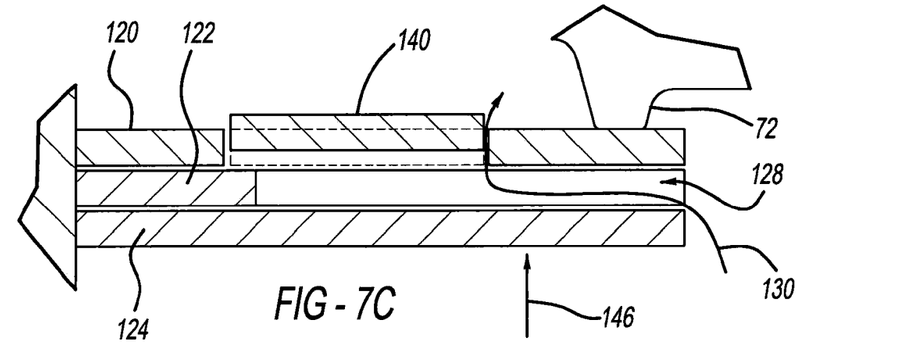

FIG. 7C illustrates a compression condition at low fluid speeds, in which fluid from lower working chamber 46 flows toward upper working chamber 44, as indicated by arrow 146. Fluid flows into orifice 128 and exerts a force onto tabs 140 of orifice check disc 120. Tabs 140 flex toward piston body 60 or, in other words, away from orifice disc 122, thereby opening bleed passage 130. Fluid from lower working chamber 46 flows through rebound fluid passages 68 and into upper working chamber 44 via bleed passage 130.

Figure 8:
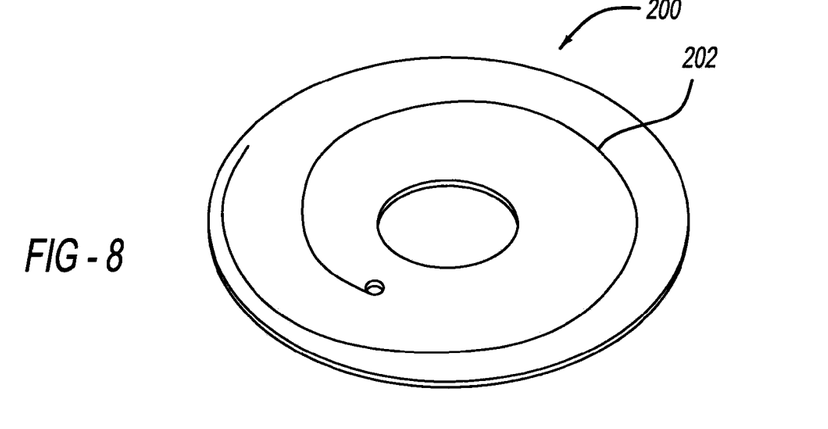
FIG. 8 is a perspective view of an orifice check disc in a second embodiment.
Figure 9:
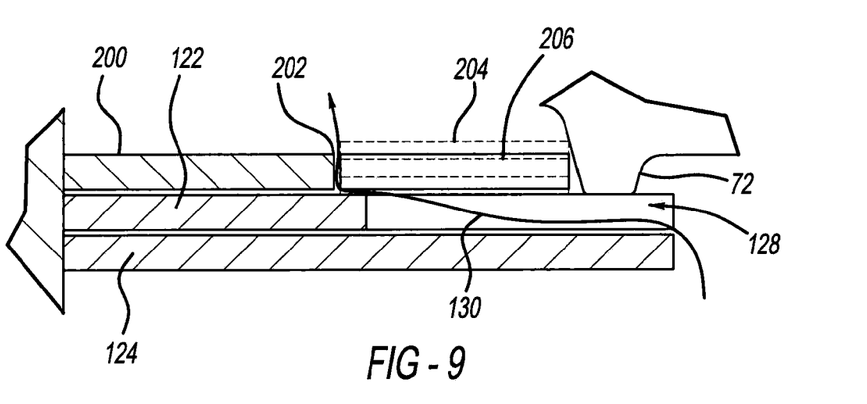
FIG. 9 illustrates the orifice check disc of FIG. 8 within a piston assembly.

While orifice check disc 120 is illustrated as having tabs 140, orifice check disc may have other suitable configuration and is not limited to the configuration depicted. For example, FIGS. 8 and 9 illustrate an orifice check disc 200. Orifice check disc 200 defines a cuts 202 that has a swirl like shape for allowing portions of orifice check disc 200 to flex. Orifice check disc 200 is disposed within piston lands 72 and does not abut against land 72 like orifice check disc 120.

Similar to orifice check disc 120, during compression, orifice check disc 200 flexes due to fluid entering orifice 128 and pressing against orifice check disc 200, thereby opening bleed passage 130. Dotted line 204 represents movement of orifice check disc 200. During rebound, orifice check disc 200 presses against orifice disc 122 to seal orifice 128 and close bleed passage 130, thereby preventing fluid from flowing from upper working chamber 44 to lower working chamber 46. Dotted line 206 represents movement of orifice check disc 200 during rebound.

Orifice check disc (120, 200) controls bleed passage 130 formed by orifice 128 of orifice disc 122 such that during rebound, bleed passage 130 is closed and during compression, bleed passage 130 is open. Accordingly, bleed passage 118 and bleed passage 130 provide damping during compression at low fluid speeds, and during rebound, bleed passage 118 provides damping at low fluid speeds. By having orifice check disc 120, 200, shock absorbers 20, 26 provide soft damping characteristics for low speed compression and hard damping characteristics for low speed rebound. Thus, the damping characteristics of shock absorbers 20, 26 may be tuned independently for rebound and compression for low fluid speeds. In the example embodiments, orifice check disc is disposed with the rebound valve disc assembly. It is readily understood that the orifice check disc may be disposed in the compression valve disc assembly for controlling the bleed passage on the compression side.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A shock absorber for a vehicle comprising:
   a pressure tube defining a fluid chamber;
   a piston rod;
   a piston disposed within the fluid chamber and coupled to the piston rod, the piston dividing the fluid chamber into an upper working chamber and a lower working chamber, the piston defining a compression passage and a rebound passage, wherein the compression passage and the rebound passage extend through the piston between the upper working chamber and the lower working chamber; and
   a valve disc assembly engaging the piston and controlling a flow of fluid between the upper working chamber and the lower working chamber, the valve disc assembly including an orifice check disc and an orifice disc, wherein
   the orifice disc defines an orifice,
   the orifice check disc is flexible and disposed between the piston and the orifice disc, the orifice check disc controls the flow of fluid through the orifice such that fluid does not flow through the orifice during a rebound stroke and flows through the orifice during a compression stroke; and
   the orifice check disc includes a plurality of cuts forming at least one tab arranged on the orifice check disc between the piston rod and inwardly of an outermost radial edge of the orifice check disc, the at least one tab operating to flex into contact with the orifice disc and to block flow through the orifice during the rebound stroke.

2. The shock absorber of claim 1 wherein the tab on the orifice check disc flexes toward the orifice disc during the rebound stroke and flexes towards the piston during the compression stroke.

3. The shock absorber of claim 1 wherein the piston includes a support land that circumferentially extends along a surface of the piston, and the orifice check disc of the valve disc assembly is disposed on the land.

4. The shock absorber of claim 1 wherein the piston includes a support land that circumferentially extends along a surface of the piston, and the orifice check disc of the valve disc assembly is disposed within the land and the orifice disc is disposed on the land.

5. The shock absorber of claim 1 wherein the orifice check disc includes a plurality of the tabs, the plurality of tabs each having an arc-like shape and each is disposed between an inner diameter and an outer diameter of the orifice check disc, the plurality of tabs flex toward the piston and flex toward the orifice disc based on a direction of the flow of fluid.

6. A shock absorber for a vehicle comprising:
   a pressure tube defining a fluid chamber;
   a piston rod;
   a piston disposed within the fluid chamber and secured to the piston rod, the piston dividing the fluid chamber into an upper working chamber and a lower working chamber, the piston defining a compression passage and a rebound passage, wherein the compression passage and the rebound passage extend through the piston between the upper working chamber and the lower working chamber; and a valve disc assembly engaging the piston and controlling a flow of fluid between the upper working chamber and the lower working chamber, the valve disc assembly including an orifice check disc and an orifice disc, wherein the orifice disc defines an orifice, the orifice forms a bleed passage between the upper working chamber and the lower working chamber, the orifice check disc is disposed between the piston and the orifice disc, and, at low fluid speeds, the orifice check disc closes the bleed passage as the fluid flows in a first direction and opens the bleed passage as the fluid flows in a second direction opposite of the first direction; and the orifice check disc includes a plurality of cuts forming at least one tab arranged on the orifice check disc between the piston rod and inwardly of an outermost radial edge of the orifice check disc, the at least one tab operating to flex into contact with the orifice disc and to block flow through the orifice during the rebound stroke.

7. The shock absorber of claim 6 wherein, in the first direction, fluid flows from the upper working chamber toward the lower working chamber and, in the second direction, fluid flows from the lower working chamber toward the upper working chamber.

8. The shock absorber of claim 6 wherein the valve disc assembly controls the flow of fluid through the rebound passage.

9. The shock absorber of claim 6 wherein orifice check disc is moveable based on the flow of fluid.

10. The shock absorber of claim 6 wherein the orifice check disc presses against the orifice disc when fluid flows in the first direction and moves away from the orifice disc when fluid flows in the second direction.

11. The shock absorber of claim 6 wherein:
the orifice check disc includes a plurality of the tabs defined by one or more cuts,
each one of the plurality of tabs has an arc-like shape and is disposed between an inner diameter and an outer diameter of the orifice check disc, and
each one of the plurality of tabs moves toward and presses against the orifice disc when fluid flows in the first direction and moves away from the orifice disc when fluid flows in the second direction.

12. A shock absorber for a vehicle comprising:
a pressure tube defining a fluid chamber;
a piston rod;
a piston disposed within the fluid chamber and coupled to the piston rod, the piston dividing the fluid chamber into an upper working chamber and a lower working chamber, the piston defining a compression passage and a rebound passage, wherein the compression passage and the rebound passage extend through the piston between the upper working chamber and the lower working chamber;
a compression valve assembly engaging the piston, wherein the compression valve assembly controls a flow of fluid through the compression passage; and
a rebound valve assembly engaging the piston and controlling the flow of fluid through the rebound passage, the rebound valve assembly including a valve disc assembly, the valve disc assembly including an orifice check disc and an orifice disc, wherein
the orifice disc defines an orifice, the orifice forms a bleed passage between the upper working chamber and the lower working chamber, the orifice check disc is disposed between the piston and the orifice disc, and the orifice check disc closes the bleed passage when fluid flows from the upper working chamber toward the lower working chamber and opens the bleed passage when fluid flows from the lower working chamber toward the upper working chamber; and the orifice check disc includes a plurality of cuts forming at least one tab arranged on the orifice check disc between the piston rod and inwardly of an outermost radial edge of the orifice check disc, the at least one tab operating to flex into contact with the orifice disc and to block flow through the orifice during the rebound stroke.

13. The shock absorber of claim 12 wherein the orifice check disc includes a plurality of the tabs, and the the tabs flex away from the orifice disc and flex toward the orifice disc based on a direction of the flow of fluid.

14. The shock absorber of claim 13 wherein the tabs flex toward and press against the orifice disc when fluid flows from the upper working chamber toward the lower working chamber and flex away from the orifice disc when fluid flows from the lower working chamber toward the upper working chamber.

15. The shock absorber of claim 12 wherein:
the tab of the orifice check disc flexes toward the orifice disc when fluid flows from the upper working chamber toward the lower working chamber, and
the tab of the orifice check disc flexes away from the orifice disc when fluid flows from the lower working chamber toward the upper working chamber.

16. The shock absorber of claim 12 wherein the valve disc assembly deflects and opens the rebound passage during the rebound stroke at mid to high fluid speeds which is greater than low fluid speed.

17. The shock absorber of claim 12 wherein:
the bleed passage defined by the orifice disc of the rebound valve assembly is a rebound bleed passage, and
the compression valve assembly defines a compression bleed passage, fluid flows between the upper working chamber and the lower working chamber via the compression bleed passage at low fluid speeds when fluid flows from the upper working chamber toward the lower working chamber and when fluid flows from the lower working chamber toward the upper working chamber.

18. A shock absorber for a vehicle comprising:
a pressure tube defining a fluid chamber;
a piston rod;
a piston disposed within the fluid chamber and coupled to the piston rod, the piston dividing the fluid chamber into an upper working chamber and a lower working chamber, the piston defining a compression passage and a rebound passage, wherein the compression passage and the rebound passage extend through the piston between the upper working chamber and the lower working chamber; and
a valve disc assembly engaging the piston and controlling a flow of fluid between the upper working chamber and the lower working chamber, the valve disc assembly including an orifice check disc and an orifice disc, wherein
the orifice disc defines an orifice,
the orifice check disc is flexible and disposed between the piston and the orifice disc, the orifice check disc controls the flow of fluid through the orifice such that fluid does not flow through the orifice during a rebound stroke and flows through the orifice during a compression stroke; and wherein the orifice check disc defines a swirl-like groove between the piston rod and inwardly of an outermost radial edge of the orifice check disc, portions of the orifice check disc that define the swirl-like cut flex toward the piston and flex toward the orifice disc based on the flow of fluid.

19. A shock absorber for a vehicle comprising:
a pressure tube defining a fluid chamber;
a piston rod;
a piston disposed within the fluid chamber and secured to the piston rod, the piston dividing the fluid chamber into an upper working chamber and a lower working chamber, the piston defining a compression passage and a rebound passage, wherein the compression passage and the rebound passage extend through the piston between the upper working chamber and the lower working chamber; and
a valve disc assembly engaging the piston and controlling a flow of fluid between the upper working chamber and the lower working chamber, the valve disc assembly including an orifice check disc and an orifice disc, wherein
the orifice disc defines an orifice, the orifice forms a bleed passage between the upper working chamber and the lower working chamber,
the orifice check disc is disposed between the piston and the orifice disc, and at low fluid speeds the orifice check disc closes the bleed passage as the fluid flows in a first direction, and opens the bleed passage as the fluid flows in a second direction opposite of the first direction; and
wherein the orifice check disc defines a swirl-like cut formed between the piston rod and inwardly of an outermost radial edge of the orifice check disc, portions of the orifice check disc that define the swirl-like cut move toward and press against the orifice disc when fluid flows in the first direction and move away from the orifice disc when fluid flows in the second direction.

* * * * *